(12) United States Patent
Iwamura et al.

(10) Patent No.: US 8,457,638 B2
(45) Date of Patent: *Jun. 4, 2013

(54) MOBILE COMMUNICATION METHOD

(75) Inventors: Mikio Iwamura, Yokohama (JP); Wuri Andarmawanti Hapsari, Yokosuka (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/492,292

(22) Filed: Jun. 8, 2012

(65) Prior Publication Data

US 2012/0244865 A1 Sep. 27, 2012

Related U.S. Application Data

(63) Continuation of application No. 12/989,798, filed on Feb. 8, 2011, now Pat. No. 8,213,939.

(30) Foreign Application Priority Data

Sep. 22, 2008 (JP) ................................. 2008-243404

(51) Int. Cl.
*H04W 36/00* (2009.01)
*H04W 4/00* (2009.01)
*H04L 9/00* (2006.01)
*H04K 1/00* (2006.01)

(52) U.S. Cl.
USPC ............................ 455/436; 455/442; 370/331

(58) Field of Classification Search
USPC ............. 455/436–444; 370/331–334; 380/44, 380/247–250, 270–273, 277
See application file for complete search history.

(56) References Cited

U.S. PATENT DOCUMENTS

| | | | |
|---|---|---|---|
| 8,072,939 B2 * | 12/2011 | Iwamura et al. | 370/331 |
| 8,213,939 B2 * | 7/2012 | Iwamura et al. | 455/436 |
| 8,218,505 B2 * | 7/2012 | Iwamura et al. | 370/331 |
| 2010/0002883 A1 * | 1/2010 | Sammour et al. | 380/272 |
| 2011/0116629 A1 * | 5/2011 | Forsberg et al. | 380/44 |

FOREIGN PATENT DOCUMENTS

WO 2007/035436 A1 3/2007

OTHER PUBLICATIONS

International Search Report and Written Opinion from PCT/JP2009/066426 dated Jan. 12, 2010 (12 pages).
Office Action for Japanese Application No. 2008-243404 mailed Jan. 5, 2010, with English translation thereof (6 pages).
3GPP TR 33.821 V0.8.0; "3rd Generation Partnership Project; Technical Specification Group Services and System Aspects; Rationale and Track of Security Decisions in Long Term Evolved (LTE) RAN / 3GPP System Architecture Evoluation (SAE) (Release 8)"; Apr. 2008; pp. 76-80 (6 pages).

(Continued)

*Primary Examiner* — Matthew Sams
(74) *Attorney, Agent, or Firm* — Osha Liang LLP

(57) ABSTRACT

In a mobile communication method according to the present invention includes the steps of: transmitting, from a handover source radio base station to a swithcing center, a handover request including an NCC, a PCI and a $K_{eNB}*$; changing, at the swithcing center, the NCC, changing, at the swithcing center, the $K_{eNB}*$ on the basis of the PCI, and transmitting, from the swithcing center to the handover target radio base station, the handover request including the changed NCC and the changed $K_{eNB}*$; generating, at the handover target radio base station, a first key on the basis of the $K_{eNB}*$; and generating, at the mobile station, the first key on the basis of the NCC and the PCI included in a handover command.

1 Claim, 7 Drawing Sheets

OTHER PUBLICATIONS

3GPP TSG SA WG3 Security—S3#52; S3-080906; "KeNB Forward Security Simplification"; Sophia-Antipolis, France; Jun. 23-27, 2008 (13 pages).

3GPP TSG RAN WG2 #63, R2-084421; "Short MAC-I for re-establishment request"; NTT Docomo, Inc.; Jeju, Korea; Aug. 18-22, 2008 (8 page).

Extended European Search Report for European Application No. 09814689.7, mailed on Mar. 18, 2011 (10 pages).

NTT Docomo, Inc., "KeNB Handling at Handover", 3GPP TSG RAN WG2 63; Tdoc-R2-084419, Aug. 22, 2008, pp. 1-8, Jeju, Korea.

Rajavelsamy R.: "Response LS to RAN2 on Authentication at RRC Connection Re-establishement", Feb. 29, 2008, pp. 1-2, 3GPP TSG SA WG3 Meeting 50, San Ya, China, S3-080226.

Mikio Iwamua: :LS on KeNB Handing at Handover, pp. 1-2, 3GPP TSG-RAN WG2 Meeting #63, Jeju, Korea, T-doc R2-084443.

Multi-KeNB* Fowarding for RRCConnections Re-establishement, 3GPP TSG SA WG3 Security—S3 54, S3-090036, Jan. 23, 2009, Florence Italy.

Office Action for Canadian Application No. 2,725,473 mailed Jul. 11, 2011 (2 pages).

Office Action for Australian Patent Application No. 2009292864 issued Aug. 13, 2012 (3 pages).

* cited by examiner

FIG. 4

```
SecurityContextInfo ::=    SEQUENCE {
    nextHopChainingCount        NextHopChainingCount,        -- NCC
    key-eNodeB-StarList         Key-eNodeB-StarList,         -- List of KeNB*
    ...
}

Key-eNodeB-StarList ::=    SEQUENCE ( SIZE (1..maxCell)) OF SEQUENCE {
    physicalCellIdentity        PhysicalCellIdentity,        -- target PCI
    earfcn-DL                   EARFCN-DL,                   -- target EARFCN-DL,
    key-eNodeB-Star             Key-eNodeB-Star              -- KeNB*
}
```

FIG. 7

```
ReestablishmentInfo ::=       SEQUENCE {
  sourcePhysicalCellIdentity    PhysicalCellIdentity,    -- source PCI
  sourceC-RNTI                  C-RNTI,                  -- source C-RNTI
  shortMAC-I-List               ShortMAC-I-List,         -- List of shortMAC-I
  ...
} shortMAC-I-List ::=  SEQUENCE ( SIZE (1..maxCell) ) OF SEQUENCE {
  cellIdentity        CellIdentity,               -- target CID
  earfcn-DL           EARFCN-DL,                  -- target EARFCN-DL,
  shortMAC-I          BIT STRING ( SIZE (16) )    -- shortMAC-I
}
```

MOBILE COMMUNICATION METHOD

CROSS-REFERENCE TO RELATED APPLICATIONS

The present application is a Continuation and claims benefit, pursuant to 35 U.S.C. §120, to U.S. patent application Ser. No. 12/989,798, filed Feb. 8, 2011 now U.S. Pat. No. 8,213,939. That application is hereby incorporated by reference in its entirety.

TECHNICAL FIELD

The present invention relates to a mobile communication method in which a mobile station performs a handover from a handover source cell under control of a handover source radio base station to a handover target cell under control of a handover target radio base station.

BACKGROUND ART

As shown in FIG. 1, a mobile communication system of the LTE (Long Term Evolution) scheme is configured so that, when a mobile station UE performs a handover from a handover source radio base station (Source eNB) to a handover target radio base station (Target eNB), the handover source radio base station (Source eNB) transmits beforehand a "UE context" of the mobile station UE to the handover target radio base station (Target eNB) during handover preparation processing (Handover Preparation).

Here, the "UE context" includes a "security context" required for "security protection (ciphering and integrity protection)" of an "access stratum (AS)".

The "security protection" of the AS is performed using a security key $K_{eNB}$ commonly used by the radio base station eNB and the mobile station UE.

Note that, in handover processing, the handover source radio base station (Source eNB) is configured to transfer, to the handover target radio base station (Target eNB), not the security key $K_{eNB}$ itself but a parameter "$K_{eNB}*$" derived from the security key $K_{eNB}$ or a parameter "next hop (NH)" previously acquired from a swithcing center MME.

DISCLOSURE OF THE INVENTION

Problems to be Solved by the Invention

However, in the conventional mobile communication system, the security key $K_{eNB}$ used in communication between the handover target radio base station (Target eNB) and the mobile station UE is generated based on a predetermined rule (KDF: Key Derivation Function) using the parameter $K_{eNB}*$ notified by the handover source radio base station (Source eNB). This allows the handover source radio base station (Source eNB) to know the security key $K_{eNB}$, which leads to a problem of security vulnerability.

The present invention was made in consideration of the foregoing problem. An object of the present invention is to provide a mobile communication method capable of keeping a security key $K_{eNB}$ secret from a handover source radio base station (Source eNB), the security key $K_{eNB}$ being used in communication between a handover target radio base station (Target eNB) and a mobile station UE.

Solution to Problem

A first aspect of the present invention is summarized as a mobile communication method in which a mobile station performs a handover from a handover source cell under control of a handover source radio base station to a handover target cell under control of a handover target radio base station, the mobile communication method comprising the steps of: (A) transmitting, from the handover source radio base station to a swithcing center, a handover request including a counter, physical cell identification information on the handover target cell and a certain parameter releting to the handover target cell; (B) changing, at the swithcing center, the counter, and changing, at the swithcing center, the certain parameter on the basis of the physical cell identification information; (C) transmitting, from the swithcing center to the handover target radio base station, the handover request including the changed counter and the changed certain parameter; (D) generating, at the handover target radio base station, a first key on the basis of the certain parameter; (E) generating, at the mobile station, the first key on the basis of the counter, the physical cell identification information and a temporary identification information, which are included in a handover command transmitted by the handover target radio base station; and (F) starting communication by using the first key between the mobile station and the handover target radio base station in the handover target cell.

In the first aspect, the handover target radio base station can generate the first key on the basis of a temporary identification information and the certain parameter, the temporary identification information being assigned to the mobile station in the handover target cell.

In the first aspect, in the step (A), the handover source radio base station can transmit physical cell identification information and the certain parameter on a first cell other than the handover target cell.

In the first aspect, in the step (B), the swithcing center can change the counter, and change all the certain parameter related to the first cell on the basis of the physical cell identification information on the first cell.

A second aspect of the present invention is summarized as a mobile communication method in which a mobile station performs a handover from a handover source cell under control of a handover source radio base station to a handover target cell under control of a handover target radio base station, the mobile communication method comprising the steps of: transmitting, from the handover source radio base station to the handover target radio base station via a swithcing center, verification information related to the handover target cell and a first cell other than the handover target cell under control of a handover target radio base station; performing, at the mobile station, a cell selection and connection re-establishment to the selected cell, when the handover to the handover target cell by the mobile station has failed; transmitting, from the mobile station to the handover target radio base station, a connection re-establishment request to the first cell including the verification information related to the first cell; and determining, at the handover target radio base station, whether or not the verification information related to the first cell transmitted by the handover source radio base station matches the verification information related to the first cell transmitted by the mobile station.

Effect of the Invention

As described above, according to the present invention, it is possible to provide a mobile communication method capable of keeping a security key $K_{eNB}$ secret from a handover source radio base station (Source eNB), the security key $K_{eNB}$ being used in communication between a handover target radio base station (Target eNB) and a mobile station UE.

BRIEF DESCRIPTION OF THE DRAWINGS

FIG. 4 is a diagram for explaining a method for transmitting a parameter $K_{eNB}{}^*$ in the mobile communication system according to the first embodiment of the present invention.

FIG. 7 is a diagram for explaining a method for transmitting a parameter shortMAC-I in the mobile communication system according to the first embodiment of the present invention.

BEST MODES FOR CARRYING OUT THE INVENTION

Mobile Communication System According to First Embodiment of the Invention

Figure 1:
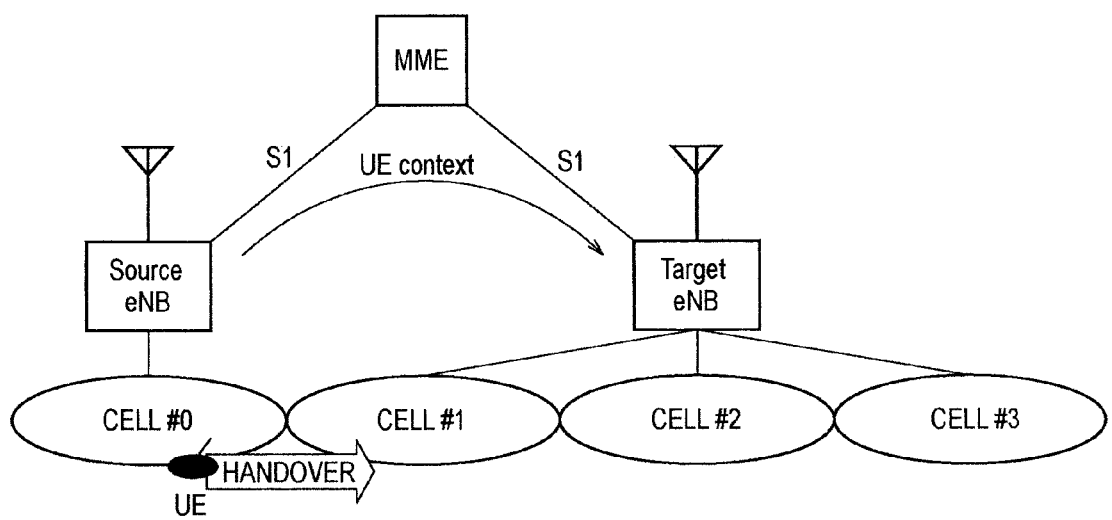
FIG. 1 is an overall configuration diagram of a mobile communication system according to a first embodiment of the present invention.

With reference to FIGS. 1 to 7, a mobile communication system according to a first embodiment of the present invention is described. As shown in FIG. 1, the mobile communication system according to this embodiment is a mobile communication system of the LTE scheme.

In this embodiment, the mobile communication system according to this embodiment is described by taking a case where a mobile station UE performs a handover from a handover source cell (cell #0) under control of a handover source radio base station (Source eNB) to a handover target cell (cell #1) under control of a handover target radio base station (Target eNB).

Figure 2:
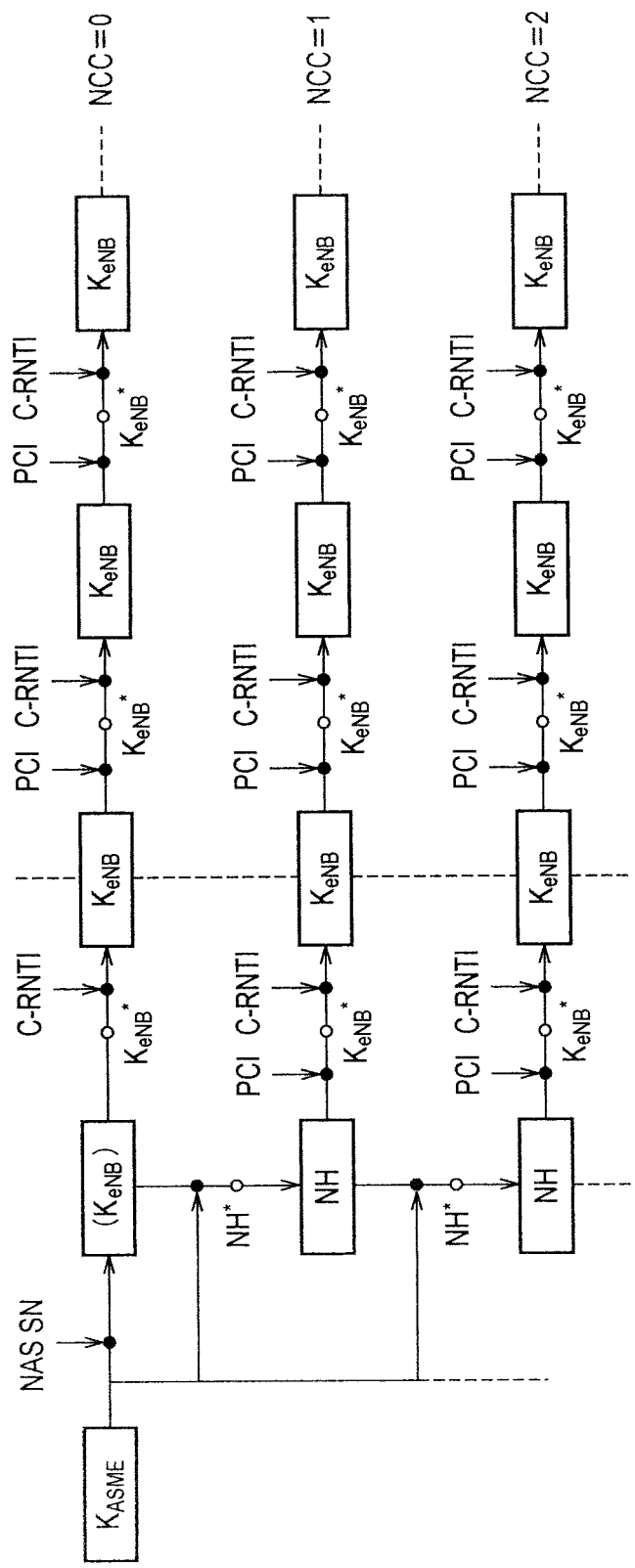
FIG. 2 is a diagram showing how a key $K_{eNB}$ is updated in the mobile communication system according to the first embodiment of the present invention.

As shown in FIG. 2, the handover target radio base station (Target eNB) is configured to generate a security key (first key) $K_{eNB}$ used in communication with the mobile station UE ("security protection" of an AS) in the handover target cell (cell #1), on the basis of a parameter (certain parameter) $K_{eNB}{}^*$ notified from the handover source radio base station (Source eNB), in handover processing.

Note that the handover target radio base station (Target eNB) may be configured to generate the security key (first key) $K_{eNB}$ used in communication with the mobile station UE ("security protection" of the AS) in the handover target cell (cell #1), on the basis of the parameter (certain parameter) $K_{eNB}{}^*$ notified from the handover source radio base station (Source eNB) and an identifier C-RNTI (Cell-Radio Network Temporary ID) assigned to the mobile station UE in the handover target cell (cell #1), in handover processing.

Here, the parameter $K_{eNB}{}^*$ is generated by the handover source radio base station (Source eNB) on the basis of a first key used in communication between the handover source radio base station (Source eNB) and the mobile station UE in the handover source cell (cell #0) and physical cell identification information PCI on the handover target cell (cell #1).

Alternatively, the parameter $K_{eNB}{}^*$ is generated by the handover source radio base station (Source eNB) on the basis of a parameter NH and the physical cell identification information PCI on the handover target cell (cell #1).

Note that the parameter NH is generated by a swithcing center MME using a key $K_{ASME}$ and is notified to the handover source radio base station (Source eNB).

Figure 3:
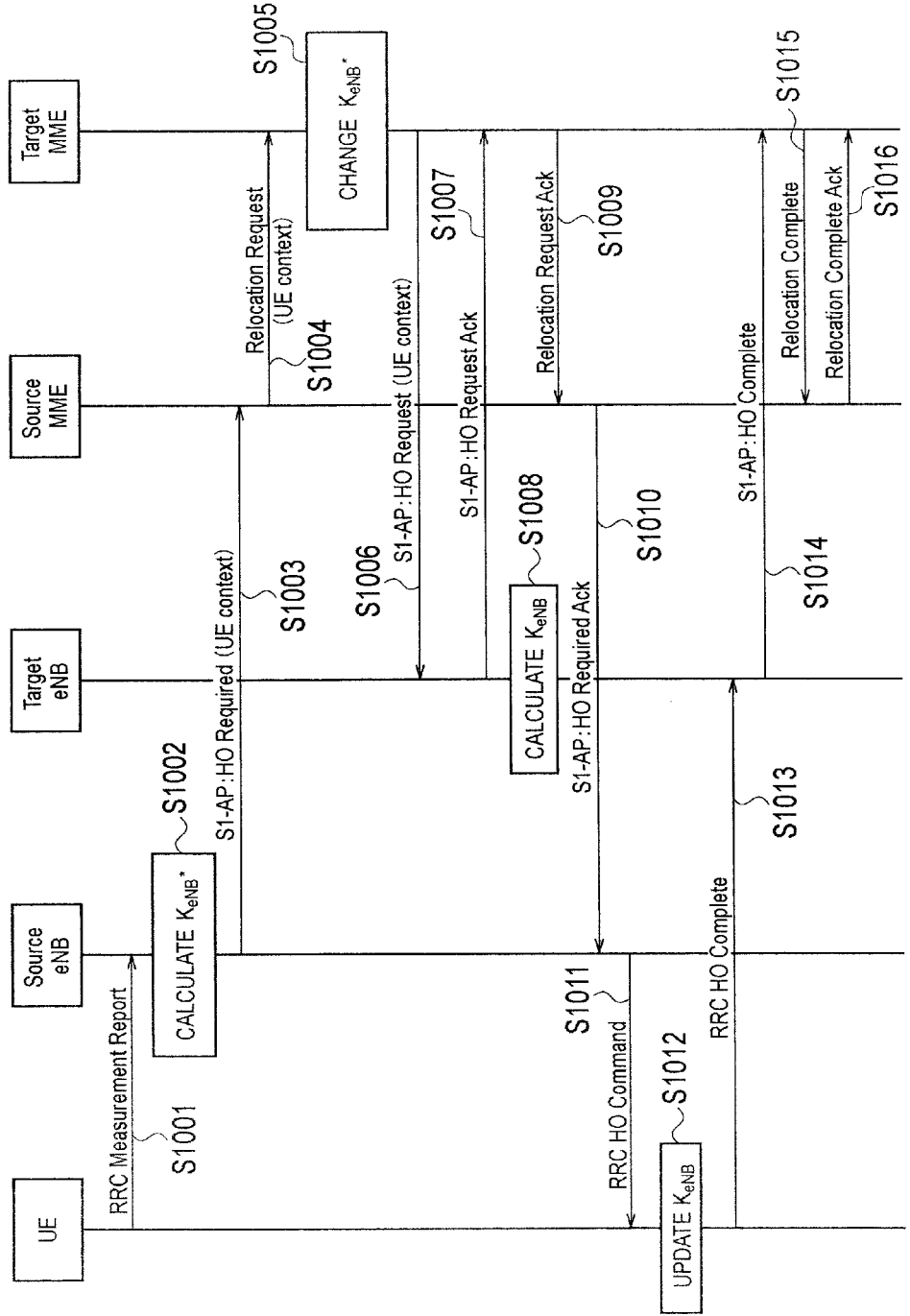
FIG. 3 is a sequence diagram showing a handover operation in the mobile communication system according to the first embodiment of the present invention.
Figure 5:
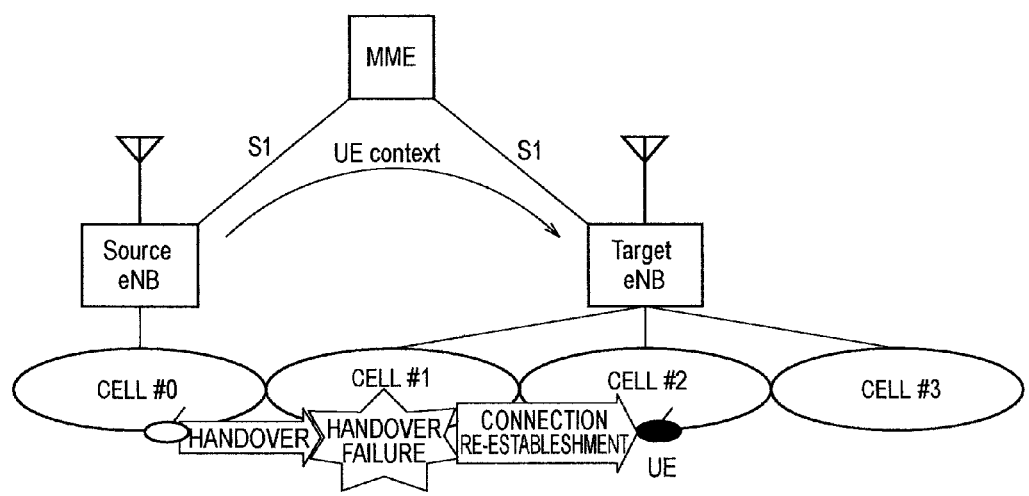
FIG. 5 is a diagram showing how connection re-establishment is performed in the mobile communication system according to the first embodiment of the present invention.

With reference to FIGS. 3 to 5, a description is given below of an operation in a case where the mobile station UE performs a handover from the handover source cell (cell #0) under control of the handover source radio base station (Source eNB) to the handover target cell (cell #1) under control of the handover target radio base station (Target eNB) in the mobile communication system according to the first embodiment of the present invention.

As shown in FIG. 3, in Step S1001, the mobile station UE transmits an "RRC Measurement Report" to the handover source radio base station (Source eNB) that manages the cell (cell #0) with which the mobile station UE is currently in communication.

In Step S1002, the handover source radio base station (Source eNB) determines to cause the mobile station UE to perform a handover to the handover target cell (cell #1) under control of the handover target radio base station (Target eNB), and calculates the parameter $K_{eNB}{}^*$ on the basis of a security key $K_{eNB}$ used in communication with the mobile station UE in the cell #0 and the physical cell identification information PCI on the handover target cell (cell #1).

Alternatively, in Step S1002, the handover source radio base station (Source eNB) determines to cause the mobile station UE to perform a handover to the handover target cell (cell #1) under control of the handover target radio base station (Target eNB), and calculates the parameter $K_{eNB}{}^*$ on the basis of the parameter NH and the physical cell identification information PCI on the handover target cell (cell #1).

In Step S1003, the handover source radio base station (Source eNB) transmits "S1-AP:HO Required" including the parameter $K_{eNB}{}^*$ to a handover source swithcing center (Source MME).

Here, the "S1-AP:HO Required" includes a counter NCC (Next hop Chaining Count), the physical cell identification information PCI on the handover target cell (cell #1), and the parameter (certain parameter) $K_{eNB}{}^*$ related to the handover target cell (cell #1).

For example, as shown in FIG. 4, the counter NCC, the physical cell identification information PCI on the handover target cell (cell #1), and the parameter $K_{eNB}{}^*$ related to the handover target cell (cell #1) are configured to be transmitted by an information element "SecurityContextInfo" in the "S1-AP:HO Required".

Here, although the information element "SecurityContextInfo" is transmitted as a part of a "UE context", the information element "SecurityContextInfo" is configured to be transmitted not as a "Transparent Container" but as one of the information elements in the "S1-AP:HO Required" in terms of an S1-AP protocol. In this way, the swithcing center MME can manipulate the "SecurityContextInfo".

Note that the handover source radio base station (Source eNB) may be configured to transmit physical cell identification information PCI (Target PCI) and a parameter $K_{eNB^*}$ related to a first cell (cell #2 or cell #3) through the "S1-AP: HO Required", the first cell being a cell other than the handover target cell (cell #1) under control of the handover target radio base station (Target eNB).

In such a case, as shown in FIG. 4, the handover source radio base station (Source eNB) may be configured to transmit a combination of multiple pieces of physical cell identification information PCI (Target PCI) and parameters $K_{eNB}*$ (List of $K_{eNB}*$) for one NCC.

Moreover, as shown in FIG. 4, the handover source radio base station (Source eNB) may be configured to transmit a downlink carrier frequency (Target EARFCN-DL) related to the handover target cell (cell #1), in addition to the counter NCC, the physical cell identification information PCI (Target PCI) on the handover target cell (cell #1), and the parameter $K_{eNB}*$ related to the handover target cell (cell #1).

In Step S1004, the handover source swithcing center (Source MME) transmits a "Relocation Request" to a handover target swithcing center (Target MME).

Here, the handover source swithcing center (Source MME) and the handover target swithcing center (Target MME) may be the same swithcing center.

In Step S1005, the handover target swithcing center (Target MME) changes the counter NCC included in the "Relocation Request", and changes the parameter $K_{eNB}*$ included in the "Relocation Request" on the basis of the physical cell identification information (Target PCI) included in the "Relocation Request".

For example, when determining to increment the "NCC" twice, the handover target swithcing center (Target MME) generates an "NH" corresponding to the "NCC" incremented twice on the basis of the key $K_{ASME}$, and generates a new parameter $K_{eNB}*$ on the basis of the generated "NH" and the physical cell identification information (Target PCI) included in the "Relocation Request".

Note that the parameter $K_{eNB}*$ and the like described above are transmitted as the information elements in the S1-AP, which allows the handover source swithcing center (Source MME) and the handover target swithcing center (Target MME) to know the parameter $K_{eNB}*$ and the like described above.

Here, when changing the "NCC", the handover target swithcing center (Target MME) may change all the parameters $K_{eNB}*$ corresponding to the "NCC" on the basis of all the pieces of physical cell identification information (Target PCI) corresponding to the "NCC".

In Step S1006, the handover target swithcing center (Target MME) transmits a "S1-AP:HO Request" including the changed counter NCC, the changed parameter $K_{eNB}*$ and the physical cell identification information (Target PCI) on the handover target cell to the handover target radio base station (Target eNB).

In Step S1007, the handover target radio base station (Target eNB) transmits a "S1-AP:HO Request Ack" to the handover target swithcing center (Target MME).

In this event, the handover target radio base station (Target eNB) creates an "RRC HO Command" to be transmitted to the mobile station UE, and transmits the "RRC HO Command" to the handover target swithcing center (Target MME) after including the "RRC HO Command" in the "S1-AP:HO Request Ack". The "RRC HO Command" includes the counter NCC received from the handover target swithcing center (Target MME) by using the "S1-AP:HO Request".

In Step S1008, the handover target radio base station (Target eNB) generates a security key (first key) $K_{eNB}$ using a parameter (certain parameter) $K_{eNB}*$ included in the "S1-AP:HO Request".

To be more specific, the handover target radio base station (Target eNB) generates the security key $K_{eNB}$ on the basis of the parameter $K_{eNB*}$ included in the "S1-AP:HO Request".

Note that the handover target radio base station (Target eNB) may generate the security key $K_{eNB}$ on the basis of the parameter $K_{eNB}*$ included in the "S1-AP:HO Request" and the temporary identification information C-RNTI assigned to the mobile station UE in the handover target cell (cell #1).

In Step S1009, the handover target swithcing center (Target MME) transmits a "Relocation Request Ack" to the handover source swithcing center (Source MME). In this event, the handover target swithcing center (Target MME) transmits the "Relocation Request Ack" after including the "RRC HO Command" in the "Relocation Request Ack", the "RRC HO Command" having been included in the "S1-AP:HO Request Ack".

In Step S1010, the handover source swithcing center (Source MME) transmits a "S1-AP:HO Required Ack" to the handover source radio base station (Source eNB). In this event, the handover source swithcing center (Source MME) transmits the "S1-AP:HO Required Ack" after including the "RRC HO Command" in the "S1-AP:HO Required Ack", the "RRC HO Command" having been included in the "Relocation Request Ack".

In Step S1011, the handover source radio base station (Source eNB) transmits an "RRC HO Command" to the mobile station UE.

In Step S1012, the mobile station UE generates a parameter (certain parameter) $K_{eNB}*$ on the basis of the counter NCC included in the "RRC HO Command" in the handover target cell (cell #1) included in the "RRC HO Command", and then generates a security key (first key) $K_{eNB}$ using the parameter $K_{eNB}*$.

Note that the parameter $K_{eNB}*$ is generated based on the physical cell identification information PCI on the handover target cell (cell #1) included in the "RRC HO Command" and any one of the parameter NH and the first key $K_{eNB}$ used in communication in the handover source cell on the basis of the counter NCC. The parameter NH is generated in the mobile station UE on the basis of the key $K_{ASME}$ possessed by the mobile station UE.

In Step S1013, the mobile station UE transmits an "RRC HO Complete" to the handover target radio base station (Target eNB). Then, in Step S1014, the handover target radio base station (Target eNB) transmits a "S1-AP:HO Complete" to the handover target swithcing center (Target MME).

In Step S1015, the handover target swithcing center (Target MME) transmits a "Relocation Complete" to the handover source swithcing center (Source MME). Then, in Step S1016, the handover source swithcing center (Source MME) transmits a "Relocation Complete Ack" to the handover target swithcing center (Target MME).

Note that, in the handover target cell (cell #1), the mobile station UE and the handover target radio base station (Target eNB) communicate with each other using the security keys (first keys) $K_{eNB}$ generated in Steps S1008 and S1012.

Here, as shown in FIG. 5, the mobile station UE performs a cell selection when the handover to the cell #1 has failed, and then tries to perform connection re-establishment to the newly found cell #2.

To be more specific, the mobile station UE transmits an "RRC Connection Re-establishment Request (connection re-establishment request)" including verification information "shortMAC-I" to the newly found cell #2.

The verification information "shortMAC-I" is like a token (shared secret) for specifying the "UE Context" of the mobile station UE in the radio base station and verifying the validity of the mobile station UE.

The handover source radio base station (Source eNB) transmits a "Handover Preparation (handover preparation signal)" to the handover target radio base station (Target eNB) through the swithcing center MME, the "Handover Preparation" including the "UE context" including the verification information "shortMAC-I" on the mobile station UE in the handover target cell.

The handover target radio base station (Target eNB) verifies the validity of the mobile station UE by checking if the verification information "shortMAC-I" received from the mobile station UE matches verification information "shortMAC-I" previously transferred from the handover source radio base station (Source eNB).

When the validity is verified, the "RRC Connection Re-establishment" is returned to the mobile station UE. This means that the connection re-establishment has succeeded.

On the other hand, when the handover target radio base station (Target eNB) has failed to confirm the match between the pieces of both verification information or when there is no verification information "shortMAC-I" on the mobile station UE or "UE context" of the mobile station UE, "RRC Connection Re-establishment Reject" is returned to the mobile station UE. This means that the connection re-establishment has failed. When the connection re-establishment has failed, the mobile station UE releases the connection of the AS and is thus set in an RRC_IDLE state.

Accordingly, in the example of FIG. 5, even if the "UE context" of the mobile station UE is stored in the cells #1 to #3 under control of the handover target radio base station (Target eNB), when the verification information "shortMAC-I" on the mobile station UE in the cells #2 and #3 is not stored, connection re-establishment to the cell #2 by the mobile station UE fails.

Figure 6:
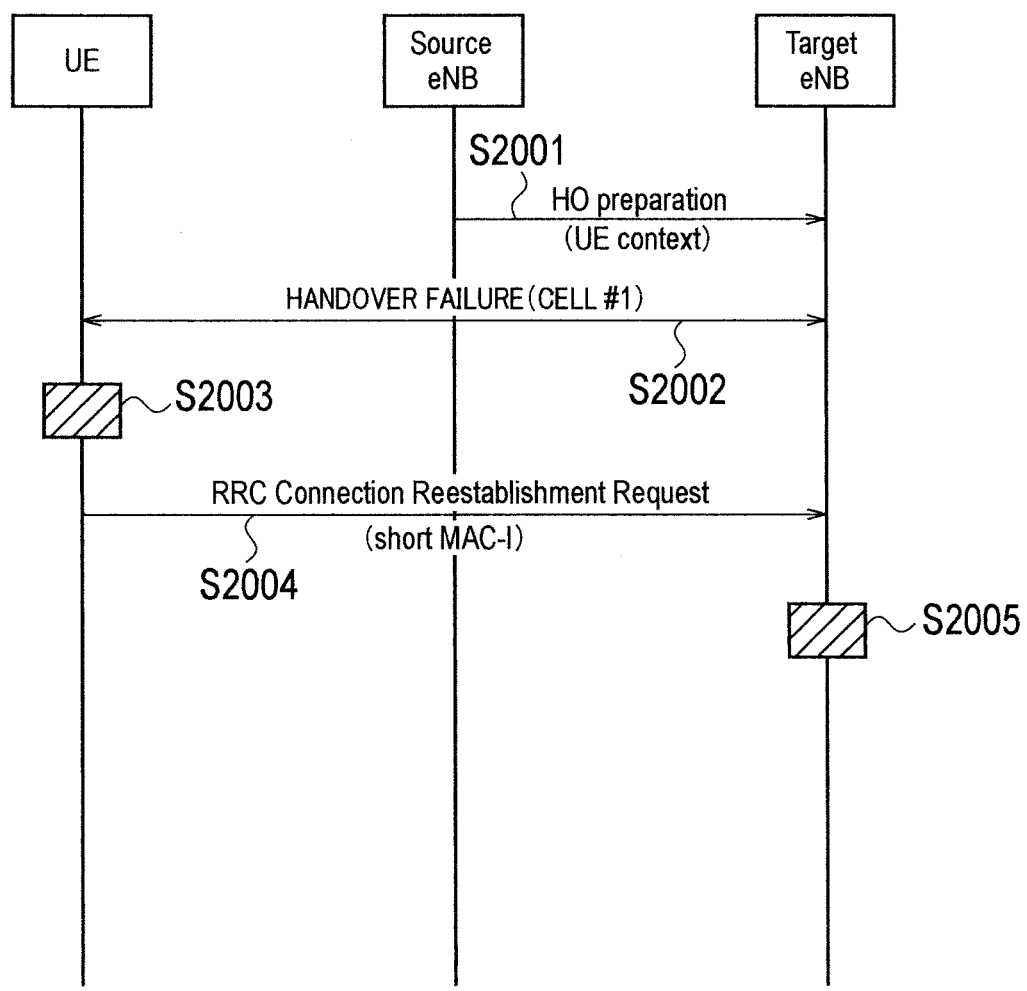
FIG. 6 is a sequence diagram showing operations in handover preparation processing in the mobile communication system according to the first embodiment of the present invention.

With reference to FIGS. 6 and 7, a description is given below of operations in handover preparation processing (Handover Preparation) for making the connection re-establishment processing successful in the above case.

As shown in FIG. 6, in Step S2001, the handover source radio base station (Source eNB) transmits "Handover Preparation" to the handover target radio base station (Target eNB).

Here, the "Handover Preparation (handover preparation signal)" includes physical cell identification information (Source PCI) on the handover source cell (cell #0), an identifier (Source C-RNTI) assigned to the mobile station UE in the handover source cell (cell #0), and verification information (shortMAC-I).

For example, as shown in FIG. 7, the physical cell identification information (Source PCI) on the handover source cell (cell #0), the identifier (Source C-RNTI) assigned to the mobile station UE in the handover source cell (cell #0), and the verification information (shortMAC-I) are configured to be transmitted by an information element "ReestablishmentInfo" in the "Handover Preparation".

Here, the information element "ReestablishmentInfo" is configured to be transmitted as a part of the "UE context".

Note that the handover source radio base station (Source eNB) may be configured to transmit verification information (shortMAC-I) on the first cell (cell #2 or cell #3) through the "Handover Preparation", the first cell being a cell other than the handover target cell (cell #1) under control of the handover target radio base station (Target eNB).

Here, the verification information (shortMAC-I) for each mobile station UE is configured to differ between cells.

When having failed to perform a handover to the cell #1 in Step S2002, the mobile station UE finds a cell #2 as a connection re-establishment target cell in Step S2003.

In Step S2004, the mobile station UE transmits an "RRC Connection Re-establishment Request" including the verification information "shortMAC-I" on the mobile station UE to the handover target radio base station (Target eNB) that manages the cell #2.

Here, having acquired the verification information "shortMAC-I" on the mobile station UE in the cell #2 in Step S2001, the handover target radio base station (Target eNB) determines in Step S2005 whether or not the verification information "shortMAC-I" on the mobile station UE included in the "RRC Connection Re-establishment Request" matches the verification information "shortMAC-I" on the mobile station UE in the cell #2 acquired in Step S2001.

When determining that there is a match between the both pieces of information, the handover target radio base station (Target eNB) determines that the validity of the mobile station UE is verified, and returns "RRC Connection Re-establishment" to the mobile station UE. This means that the connection re-establishment has succeeded.

Advantageous Effects of Mobile Communication System According to First Embodiment of the Invention In the mobile communication system according to this embodiment, the swithcing center MME can change the parameter $K_{eNB}$* generated by the handover source radio base station (Source eNB). Accordingly, the security key $K_{eNB}$ can be kept secret from the handover source radio base station (Source eNB), the security key $K_{eNB}$ being used in communication between the handover target radio base station (Target eNB) and the mobile station UE.

In the mobile communication system according to this embodiment, the handover source radio base station (Source eNB) transmits the parameter "$K_{eNB}$*" in the first cell, in addition to the parameter "$K_{eNB}$*" in the handover target cell, the first cell being a cell other than the handover target cell under control of the handover target radio base station (Target eNB). Thus, a failure in connection re-establishment to the first cell storing the "UE context" can be avoided when the mobile station UE has failed to perform a handover to the handover target cell.

In the mobile communication system according to this embodiment, the handover source radio base station (Source eNB) transmits the verification information "shortMAC-I" on the mobile station UE in the first cell, in addition to the verification information "shortMAC-I" on the mobile station UE in the handover target cell, the first cell being a cell other than the handover target cell under control of the handover target radio base station (Target eNB). Thus, a failure in connection re-establishment to the first cell storing the "UE context" can be avoided when the mobile station UE has failed to perform a handover to the handover target cell.

Note that operation of the above described mobile station UE, the radio base station eNB and the swithcing center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB and the swithcing center MME. Also, the storage medium and the processor may be provided in the mobile station UE, the radio base station eNB and the swithcing center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method in which a mobile station performs a handover from a handover source cell under control of a handover source radio base station to a handover target cell under control of a handover target radio base station, the mobile communication method comprising the steps of:
   transmitting, from the handover source radio base station to a mobility management entity, verification information;
   incrementing, at the mobility management entity, a counter (NCC), and generating a parameter (NH) of the handover target cell, based on the incremented counter;
   transmitting, from the mobility management entity to the handover target radio base station, the incremented counter and the generated parameter (NH) of the handover target cell;
   generating, at the handover target radio base station, a security key (KeNB) of the handover target cell, based on the received parameter (NH) of the handover target cell;
   transmitting, from the handover target radio base station to the mobile station via the mobility management entity and the handover source radio base station, a handover command signal including the incremented counter;
   generating, at the mobile station, the security key (KeNB) of the handover target cell, based on the incremented counter included in the received handover command signal;
   transmitting, from the mobile station to the handover target radio base station, a handover complete signal by using the security key of the handover target cell;
   performing, at the mobile station, a cell selection and finding a first cell other than the handover target cell, said first cell being under control of the handover target radio base station, as the selected cell, when the handover to the handover target cell by the mobile station has failed;
   transmitting, from the mobile station to the handover target radio base station, a connection re-establishment request signal including verification information;
   verifying, at the handover target radio base station, the validity of the mobile station, by checking whether or not the verification information received from the mobile station matches verification information previously received from the handover source radio base station via the mobility management entity; and
   generating, at the mobile station and the handover target radio base station, a security key (KeNB) of the first cell, when the validity is verified.

* * * * *